United States Patent
Gyetko

(10) Patent No.: US 7,415,015 B2
(45) Date of Patent: Aug. 19, 2008

(54) CENTRALIZED IGMP GMQ TIMING

(75) Inventor: Gregory Gyetko, Dunrobin (CA)

(73) Assignee: Alcatel, Paris (FR)

( * ) Notice: Subject to any disclaimer, the term of this patent is extended or adjusted under 35 U.S.C. 154(b) by 735 days.

(21) Appl. No.: 10/869,938

(22) Filed: Jun. 18, 2004

(65) Prior Publication Data
US 2005/0002396 A1    Jan. 6, 2005

Related U.S. Application Data

(60) Provisional application No. 60/483,647, filed on Jul. 1, 2003.

(51) Int. Cl.
*H04L 12/56* (2006.01)
(52) U.S. Cl. .................. 370/390; 370/432; 370/254; 709/238
(58) Field of Classification Search .................. None
See application file for complete search history.

(56) References Cited

U.S. PATENT DOCUMENTS

| 2004/0090970 A1* | 5/2004 | Sanchez et al. | 370/397 |
| 2004/0111470 A1* | 6/2004 | Poulsen et al. | 709/204 |
| 2005/0002397 A1* | 1/2005 | Poulsen et al. | 370/390 |
| 2007/0011350 A1* | 1/2007 | Lu et al. | 709/238 |

OTHER PUBLICATIONS

W. Fenner: "Request for Comments 2236: Internet Group Management Protocol, Version 2", Network Working Group, 1997, pp. 1-24.
Cain B et al: "Request for Comments 3336: Internet Group Management Protocol, Version 3", Network Working Group, Oct. 1, 2002, pp. 1-53.
Wittmann et al; "Multicast Communication, Protocols and Applications", May 12, 2000 (pp. 62-67).
Alcatel 7300 ASAM, Advanced Services Access Manager (ANSI Version), Technical Information Guide, www.alcatel.com Undated.

* cited by examiner

*Primary Examiner*—Wing F. Chan
*Assistant Examiner*—Robert C Scheibel
(74) *Attorney, Agent, or Firm*—Bacon & Thomas, PLLC

(57) ABSTRACT

A system and method for performing IGMP at an router, GMQ on homes serviced by the IGMP router or channels. Each channel has a corresponding broadcast group characterized in that a plurality of the counters are provided at the IGMP router. Each counter is associated with the unique host and channel combination and is incremented after a response time interval, which begins when the IGMP router sends a GMQ message to the host, has elapsed and the IGMP router has failed to receive a Join report for the host and channel combination associated with that counter and responsive to a counter being equal to a selected robustness parameter, the host and channel combination associated with the counter is dropped from the broadcast group corresponding to the channel of that host and channel combination.

4 Claims, 2 Drawing Sheets

CENTRALIZED IGMP GMQ TIMING

REFERENCE TO RELATED APPLICATION

The present application is the subject of provisional application No. 60/483,647 filed Jul. 1, 2003 entitled Centralized IGMP GMQ Audit Timing, for which priority is claimed.

BACKGROUND AND BRIEF DESCRIPTION OF THE INVENTION

The invention relates to the problem of efficiently performing Internet Group Management Protocol (IGMP) General Membership Queries (GMQs) on a large number of DSL (digital subscriber line) subscribers, particularly to enforcing requirements on the timeliness of responses to the queries by the subscribers' CPE (customer premise equipment). This CPE would normally be a Set-top Box (STB), and is also referred to as a host in the IGMP nomenclature. The equipment at the network side that services a group of hosts is known as an IGMP router. A host can receive several channels at one time through a router.

FIG. 1 (prior art) shows the timing of GMQ procedure specified in the IGMP RFC (rfc2236—Internet Group Management Protocol, Version 2). According to the GMQ procedure in the RFC, once every GMQ Interval an IGMP router broadcasts a GMQ message to the hosts that it services. Each host should then respond with a Join Report for every channel that it is receiving. The timeliness of the response is globally selectable for each router. The parameter providing the selectability is known as the robustness parameter, which specifies the maximum amount of time, in terms of an integer multiple GMQ cycles, within which a host must respond.

In the case of the Alcatel 7300 ASAM, the default value of the robustness parameter is two and the GMQ Interval cycle is 125 seconds long. Hence the default time limit for the response is two GMQ Intervals plus a 10 second response window (i.e. 2×125 s+10 s=260 s). If a router fails to receive a response for a particular host and channel within this time limit the host is removed from the broadcast group for that channel.

A problem with this procedure is that it requires a timer for each host and channel combination so that the router can measure and enforce the time limit allowed for each response. Since a router supports a large number of hosts and each host can carry a large number of channels, the number of timers required could be very large, typically in the thousands. This is problematic because each timer requires processing resources; hence the cumulative processing resources required for all of the timers can be quite significant. In fact, experience has shown that the processing resources required for the timers can encroach upon the processing resources needed for other functions. Therefore, a more processing-efficient way of enforcing the time limit for responding to GMQ messages is desired.

THE PRESENT INVENTION

The present invention is directed to a system and method for performing IGMP at an router, GMQ on homes serviced by the IGMP router or channels. Each channel has a corresponding broadcast group characterized in that a plurality of the counters are provided at the IGMP router. Each counter is associated with the unique host and channel combination. Each counter is incremented after a response time interval, which begins when the IGMP router sends a GMQ message to the host, has elapsed and the IGMP router has failed to receive a Join report for the host and channel combination associated with that counter and responsive to a counter being equal to a selected robustness parameter, the host and channel combination associated with the counter is dropped from the broadcast group corresponding to the channel of that host and channel combination. In addition, the response time interval is timed by one timer for all of the host and channel combinations. The same value of the robustness parameter is applicable to all the counters and is likewise programmable. Finally, the GMQ messages are broadcast at regular intervals, the time value of which is selectable.

DESCRIPTION OF THE DRAWINGS

The above and other objects, advantages and features of the invention will become more apparent when considered with the accompanying specification and attached drawings wherein.

DETAILED DESCRIPTION OF THE INVENTION

Figure 2:
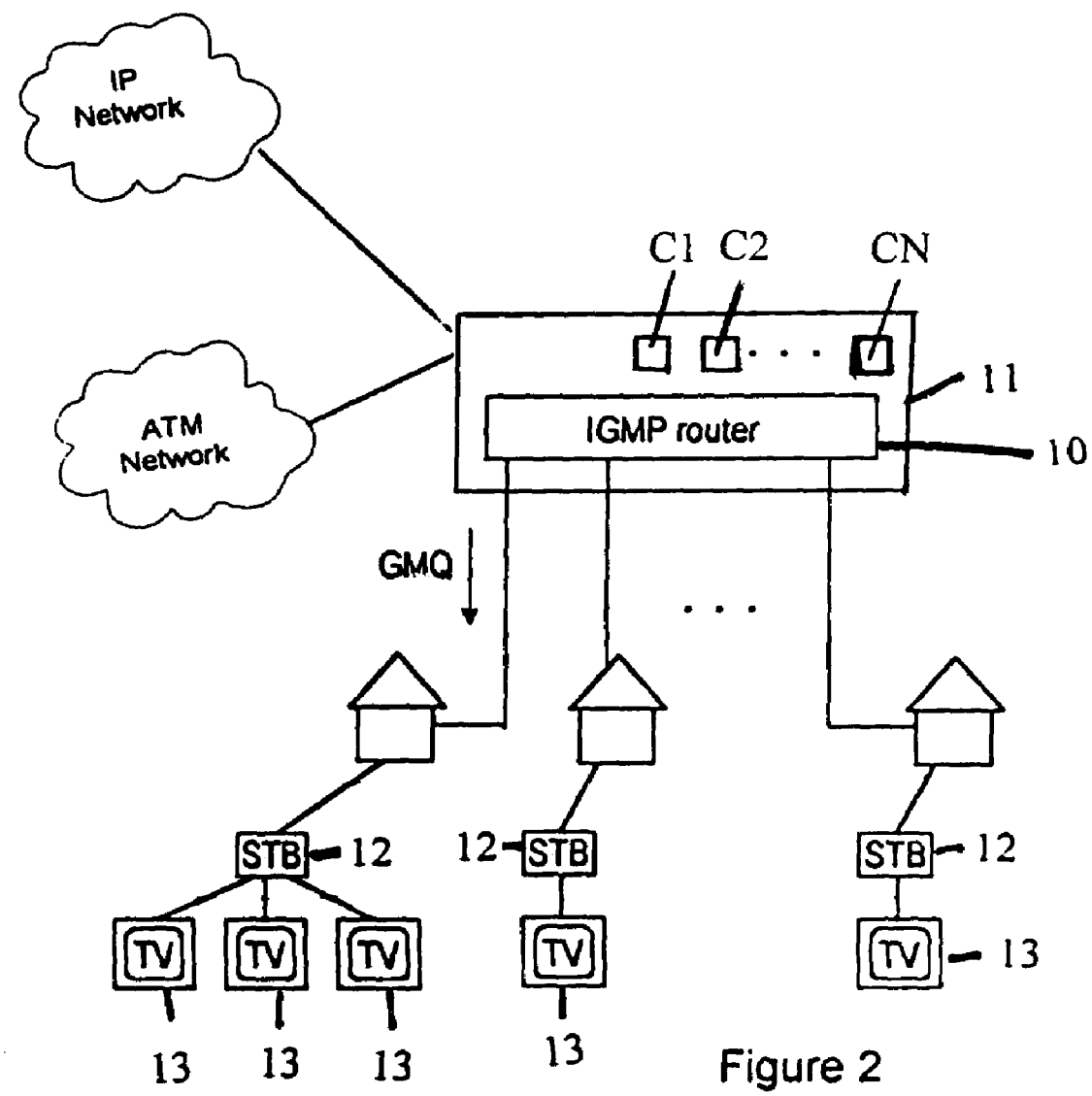
FIG. 2 illustrates an internet accessing system incorporating the invention.

The invention relates to a system for monitoring internet group management protocol (IGMP) general member queries (GMQs) on a large number of digital subscriber line (DSL) subscribers, particularly for enforcing requirements on the timeliness of responses to the queries by the subscriber customer premise equipment (CPE). The CPE is normally a set-top box STB and is also referred to as a host in the IGMP nomenclature. The system is illustrated in FIG. 2 wherein an IGMP router 10 of an ATM subscriber access multiplexer 11 incorporates counters $C_1, C_2 \ldots CN$. Router 10 provides xDSL to a large number of hosts 12 (e.g. set top boxes STB). Each host 12 can support multiple user devices 13 and receive multiple broadcast channels for this purpose. Equipment at the network side that services a group of hosts is the IGMP router 10.

Figure 1:
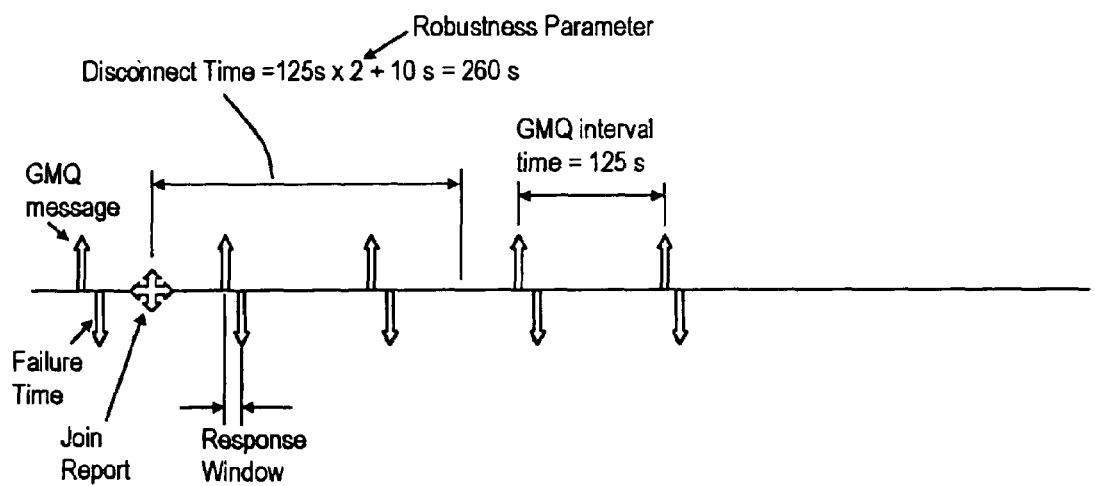
FIG. 1 is a timing chart illustrating the timing of events in the prior art discussed above.
Figure 3:
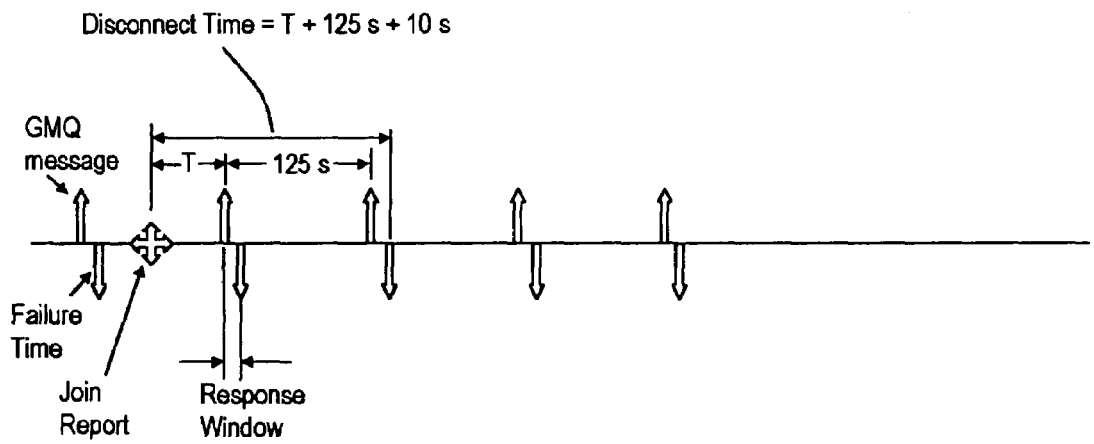
FIG. 3 is a timing chart of the timing according to the present invention.

FIG. 3 shows the timing of the procedure for performing GMQs according to the invention. A counter $C_1, C_2 \ldots CN$ is used for every host and channel combination instead of a timer. This results in the same number of counters as timers that would be used in the prior art; however, the counters $C_1, C_2 \ldots CN$ use far less processing resources than the timers. This is because the timers must be incremented at least every second, whereas the counters are incremented upon the occurrence of events.

According to the invention, each counter $C_1, C_2 \ldots CN$ is used to count, for a particular host and channel combination, the number of GMQ messages that the host has failed to respond to since that host's last join message for that channel. This join message could be an initial join message or a response to a prior GMQ message. The 10-second response window after a GMQ is allowed for hosts to respond before any counter is incremented. Only one timer is required to measure this time for all counters. If the value of a counter associated with a given host and channel combination equals the robustness parameter, then the router will remove that host from the broadcast group for that channel. Otherwise, the host will remain in the broadcast group and continue to receive broadcast information carried on that channel.

Advantages of the invention include the following:
1. The IGMP router supports many IGMP hosts and therefore it must perform its functions with great processing efficiency to enable a cost-effective implementation. The present invention provides a more processing-efficient way of performing GMQs, while keeping within the spirit of the IGMP RFC (i.e. it still provides the same number of IGMP messages to which a host can respond before the channel to which it was listening is discontinued, although the amount of time for a response is less).
2. For the same robustness parameter and GMQ Interval length, the invention provides a more efficient use of router-to-host bandwidth because it drops channels previously wanted by unresponsive hosts sooner than the prior art approach.

The invention provides a more cost-effective solution for IGMP, which is useful for widely applicable applications such as providing broadcast television over DSL services.

Thus, the invention provides a method for performing at the IGMP router level GMQ on hosts serviced by the IGMP router over channels, with each channel having a corresponding broadcast group characterized in that there are a plurality of counters sited at the IGMP router, each counter being associated with a unique host and channel combination. Each counter is incremented after a response time interval, which begins when the IGMP router sends a GMQ message to the host, has elapsed and the IGMP router has failed to receive a Join report for the host and channel combination associated with that counter, means responsive in the counter being equal to a selected robustness parameter. The host of the host channel combination associated with the net counter is discontinued and/or dropped from the broadcast group corresponding to the channel of that host in the channel combination.

The invention features a system for performing, at an IGMP router, GMQ on hosts serviced by the IGMP router over channels, each channel having a corresponding broadcast group, characterized in that a plurality of counters are sited at the IGMP router, each counter being associated with a unique host and channel combination. Each counter is incremented after a response time interval, which begins when the IGMP router sends a GMQ message to the hosts, has elapsed and the IGMP router has failed to receive a join report for the host and channel combination associated with the counter. There is provided means responsive to a counter equal to a selected robustness parameter, the host of the host and channel combination associated with that counter is discontinued and/or dropped from the broadcast group corresponding to the channel of that host and channel combination.

The invention features the above system wherein the response time interval is timed by one timer for all of the host and channel combinations.

The invention further features the above system wherein the same value of the robustness parameter is applicable to all of the counters.

The invention further features the above system wherein GMQ messages are broadcast at regular intervals, the time value of which is selectable.

Finally, the invention features a method for performing at an IGMP router GMQ on hosts serviced by the IGMP router over channels, each channel having a corresponding broadcast group, characterized by: providing a plurality of counters C1, C2 . . . CN sited at the IGMP router, associating each counter with the unique host and channel combination, incrementing each counter after a response time interval which begins when the IGMP router sends a GMQ message to the host has elapsed and the IGMP router has failed to receive a join report for that host and channel combination associated with that counter and dropping the broadcast group corresponding to the channel of that host and channel combination when the counter equals a selected robustness parameter.

While the invention has been described in relation to preferred embodiments of the invention, it will be appreciated that other embodiments, adaptations and modifications of the invention will be apparent to those skilled in the art.

What is claimed is:

1. A system for performing a General Membership Query (GMQ) on an Internet Group Management Protocol (IGMP) router on homes serviced by the IGMP router or channels wherein each channel has a corresponding broadcast group, the system comprising:
a plurality of hosts; and
an IGMP router, the router characterized in that:
a plurality of counters are provided at the IGMP router,
each counter being associated with a unique host and channel combination,
each counter being incremented after a response time interval, said response time interval beginning when the IGMP router sends a GMQ message to the host, has elapsed and the IGMP router has failed to receive a Join report for the host and channel combination associated with that counter and responsive to a counter being equal to a selected robustness parameter, the host and channel combination associated with the counter is dropped from the broadcast group corresponding to the channel of that host and channel combination, and wherein the response time interval is timed by one timer for all of the host and channel combinations and the same value of the robustness parameter is applicable to all the counters and is likewise programmable.

2. The invention defined in claim 1 wherein the GMQ messages are broadcast at regular intervals, the time value of which is selectable.

3. A method for performing a General Membership Query (GMQ) on an Internet Group Management Protocol (IGMP) router on homes serviced by the IGMP router or channels wherein each channel has a corresponding broadcast group characterized in that:
providing a plurality of counters are provided at the IGMP router,
associating each counter with a unique host and channel combination,
incrementing each counter after a response time interval, said response time interval beginning when the IGMP router sends a GMQ message to the host, has elapsed and the IGMP router has failed to receive a Join report for the host and channel combination associated with that counter and responsive to a counter being equal to a selected robustness parameter, the host and channel combination associated with the counter is dropped from the broadcast group corresponding to the channel of that host and channel combination, and wherein the response time interval is timed by one timer for all of the host and channel combinations and the same value of the robustness parameter is applicable to all the counters and is likewise programmable.

4. The invention defined in claim 3 wherein the GMQ messages are broadcast at regular intervals, the time value of which is selectable.

* * * * *